INVENTOR.
JOHN P. NICOLOSI
BY W R Mabley
Laurence S. Epstein
ATTORNEYS

INVENTOR.
JOHN P. NICOLOSI
BY W.R. Matthey
Laurence S. Epstein
ATTORNEYS

United States Patent Office 2,892,981

Patented June 30, 1959

2,892,981

F-M MONODIRECTIONAL DEVIATION CIRCUIT

John P. Nicolosi, Brooklyn, N.Y.

Application July 10, 1957, Serial No. 671,112

9 Claims. (Cl. 332—16)

(Granted under Title 35, U.S. Code (1952), sec. 266)

The invention described herein may be manufactured and used by or for the Government of the United States of America for governmental purposes without the payment of any royalties thereon or therefor.

The present invention relates generally to F-M modulator circuits and especially to a circuit which produces an F-M output signal in which the frequency shift takes place on one side only of the resting frequency.

In the conventional frequency-modulated signal, the modulating signal swings the frequency equally on both sides of the carrier or resting frequency. The total frequency shift known as the "carrier swing," the shift on either side of the resting frequency being called the "frequency deviation."

In F-M equipment in which F-M noise-producing circuits are utilized, it is sometimes desirable to develop a narrow-band output signal in which the deviation occurs on one side only of the resting frequency. The present invention permits the production of this type of F-M signal directly rather than indirectly by the production of a conventional F-M signal and subsequent suppression of frequencies on one side of the resting frequency.

The objects and advantages of the present invention are accomplished by deriving a floating bias voltage from the modulating signal and then superimposing the modulating signal upon the floating bias in such a way that the latter becomes the average value of the new composite signal. The composite signal is used as the input to the modulator.

In a typical embodiment of the invention, the modulating signal is applied to a transformer, rectified and then filtered to provide an output voltage which is equal to the envelope of the rectified modulating signal. The output of the filter and the modulating signal (obtained from another winding on the transformer) are applied in series to an output resistance one side of which is grounded. The voltage across this resistance is then the original modulating signal varying around the output of the filter as an average value, the turns ratio of the transformer winding being such that this composite signal never goes below ground. The composite signal is employed as the modulating signal for a reactance tube modulator and oscillator.

An object of this invention is to produce a modulating signal which will swing the frequency of the output signal of an F-M oscillator on only one side of its resting frequency.

Another object is to operate upon an F-M modulating signal so that its minimum value is always a specific reference potential and all of its other values are algebraically greater than this specific reference potential.

Other objects and many of the attendant advantages of this invention will be readily appreciated as the same becomes better understood by reference to the following detailed description when considered in connection with the accompanying drawings wherein.

Figure 1:
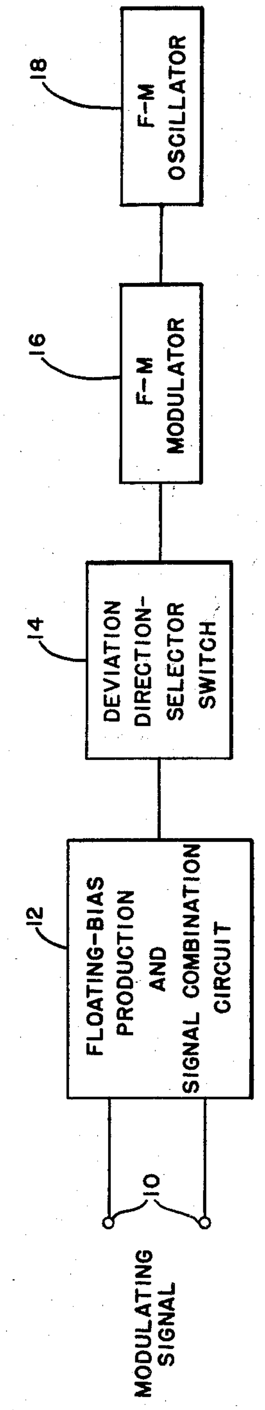
Fig. 1 is a block diagram of the invention.

Fig. 1 shows in block form the overall system employed in practicing the invention. The modulating signal, instead of being fed directly to the F-M modulator 16, is fed through connections 10 to the floating-bias production and signal combination circuit 12. The latter circuit 12 derives from the modulating signal a floating bias voltage which corresponds to the envelope of the rectified modulating signal and recombines this voltage with the modulating signal. Two different composite signals are produced—the first having all values positive with respect to a reference potential, and the second having all values negative with respect to the reference potential.

Either of these composite signals may be selected by means of the deviation-direction selector switch 14 for application to the F-M modulator 16. The selection of a given composite signal determines the direction of deviation from resting frequency of the final F-M output signal from the oscillator 18.

Figure 2:
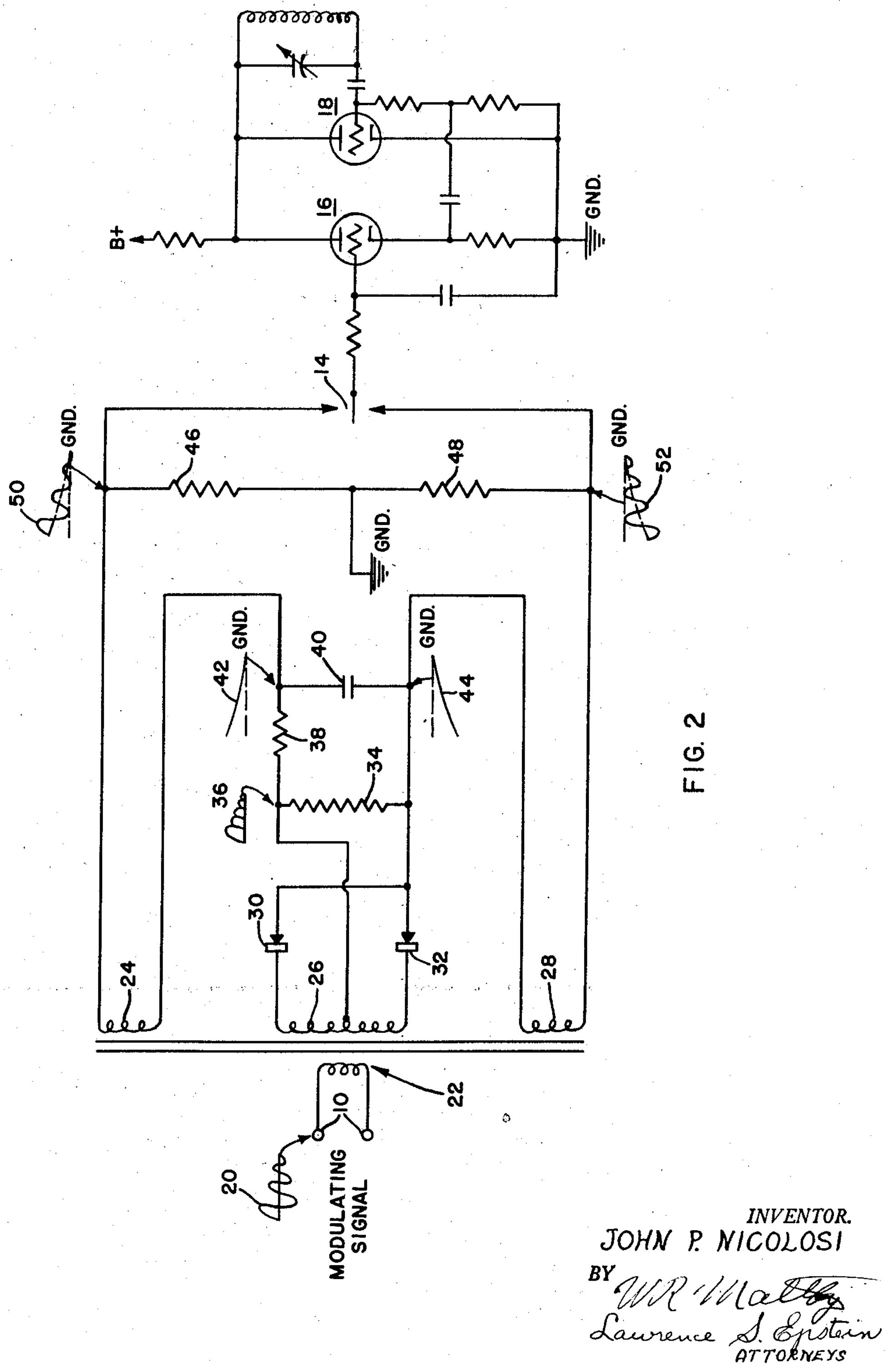
Fig. 2 is a schematic circuit diagram of one embodiment of the invention.

Referring now to Fig. 2 for specific details, a modulating signal, which may for instance be a damped oscillation 20 such as might be employed in noise-producing equipment, is fed through a pair of connections 10 to the signal input transformer 22, which may be an audio driver or modulation type. The transformer 22 has three secondary windings, 24, 26 and 28, one of which is center tapped. A possible set of turns ratios which may be employed is 1:1 for the two untapped windings 24 and 28 and 1:4 for the center tapped winding 26.

The center-tapped secondary winding 26 is combined with a pair of unidirectional current devices 30 and 32 and an impedance element 34 in a full-wave rectifying circuit. The unidirectional current devices may be vacuum tubes, crystal detectors, etc., and the impedance element may be a resistor, for example.

The signal existing across impedance element 34 is a fully rectified damped wave 36. This wave 36 is fed through a filter having a long time constant relative to the period of one cycle of the modulating signal 20, so that the filtered signal follows the peak values of the rectified wave 36, or reproduces the envelope of the rectified modulating signal 36. The filter may be a conventional series resistance 38 and condenser 40.

The filter condenser 40 is in series with transformer winding 24, an output impedance element 46, another output impedance element 48 and transformer winding 28. The junction between the output impedance elements 46 and 48, which may be resistors, is placed at a specific reference potential, such as ground for example. Thus, the potential of the filtered wave at one terminal of filter condenser 40 will be positive with respect to ground while that at the other terminal will be negative with respect to ground. The sum of the resistance of resistors 46 and 48 should be high in comparison to the impedance of condenser 40 so that the operation of the filter is undisturbed.

The signal appearing across the resistor 46 will be a composite signal 50 which is a combination of the filtered wave 42 and the modulating signal appearing across the transformer winding 24. If the proper transformer ratios and circuit constants are employed, the composite signal 50 will be a replica of the original modulating signal riding upon the filtered wave 42 as an average value. The minimum value of each cycle of the composite signal 50 will be ground potential and all other values of the signal 50 will be algebraically greater than ground potential (positive with respect to ground in this case).

Similarly, the composite signal 52 appearing across the resistor 48 will be the same as that across the resistor 46 except that it will be negative with respect to ground.

It may be noted at this point that the filtered wave forms a varying average value, which may be called a floating bias, for the modulating signal.

Either positive or negative composite signal may be selected alternatively by selector switch 14, which may be a manually operated, single-pole, double-throw switch, for application as an input signal to the F-M modulator circuit 16. The modulator 16 is connected across the F-M oscillator 18.

The F-M modulator 16 shown in Fig. 2 is a modified reactance tube circuit. Any conventional F-M circuitry may be employed if it accepts an input which may alternatively vary on either side of ground and furnishes an output signal in which the resting frequency is generated in response to an input signal of ground potential at the modulator.

A signal of ground potential at the control grid of the modulator tube results in oscillation of the oscillator circuit 18 at its resting frequency, as determined by the constants of its tank circuit. Application of composite signal 50 will vary the frequency of the oscillator circuit 18, the frequency deviation of the output signal being in one direction only (that is, all output signal shifts from the resting frequency being alternatively either above or below the resting frequency) since all fluctuations of the composite signal 50 are on one side only of ground.

Obviously many modifications and variations of the present invention are possible in the light of the above teachings. It is therefore to be understood that within the scope of the appended claims the invention may be practiced otherwise than as specifically described.

What I claim is:

1. A circuit for producing a frequency-modulated wave having a frequency deviation on one side only of the resting frequency comprising, in combination: connections to a source of modulating signal; means for deriving from said modulating signal a signal proportional in amplitude to the amplitude of the envelope of said modulating signal; means for combining said modulating signal and said derived signal into a composite signal in which said derived signal forms the average value about which said modulating signal swings; and an F-M modulator and oscillator circuit, said modulator having said composite signal as an input signal, the minimum value of said composite signal being always algebraically equal to or greater than that value of input signal to the modulator which causes the oscillator to produce an output signal at the resting frequency, whereby the swings of said modulating signal produce frequency shifts in said output signal on one side only of said resting frequency.

2. A circuit as set forth in claim 1, wherein the amplitude of said derived signal is equal to the amplitude of the envelope of said modulating signal.

3. A circuit as set forth in claim 1, wherein the amplitude of said derived signal is equal to the amplitude of the envelope of said modulating signal and the minimum value of said composite signal is equal to that value of input signal to the modulator which causes the oscillator to produce an output signal at the resting frequency.

4. A circuit as set forth in claim 1, wherein said deriving means includes a half-wave rectifying circuit and a filtering circuit, the latter being connected to receive the output of the former, said filtering circuit having a long time constant relative to the period of one cycle of said modulating signal.

5. A circuit as set forth in claim 4, wherein one side of said rectifying circuit is at a reference potential and said derived signal varies in relation to said reference potential, said reference potential corresponding in value to that value of input signal which causes the oscillator to produce an output signal at the resting frequency.

6. A circuit for producing a frequency-modulated wave having a frequency deviation on one side only of the resting frequency comprising, in combination: connections to a source of modulating signal; a transformer connected to said modulating signal connections, said transformer having three output windings, one being center-tapped; a pair of unidirectional current devices and an output impedance, said devices and impedance being connected in a full-wave rectifying circuit with said center-tapped winding of the transformer; a filtering circuit connected to receive the output of said rectifying circuit, the time constant of said filtering circuit being long compared to the period of one cycle of said modulating signal; a pair of impedances, each connected in series with a different one of the remaining windings of said transformer and the output of said filtering circuit, the free end of each impedance being connected to ground, so that the output of said filtering circuit is effectively divided into a pair of outputs, one positive and the other negative with respect to ground, each output being equal in amplitude to the peak value of the rectified modulating signal, the signal across one said impedance being a positive composite signal comprising the modulating signal with the positive filtered signal as the average value thereof, the minimum value of the positive composite signal being ground potential, and the signal across the other said impedance being similar in character to the positive composite signal except that the negative filtered signal forms its average value; a switch connected across said impedances so that either the positive or the negative composite signal can be selected as an output; and an F-M modulator and oscillator circuit, said modulator being connected to said switch to receive either composite signal as an input, said modulator being arranged so that an input signal thereto of ground potential causes the oscillator to produce an output signal at the resting frequency, the positive composite signal producing an F-M output signal varying on one side only of the resting frequency and the negative composite signal producing an F-M output signal varying on the other side only of the resting frequency.

7. A circuit for use with an F-M modulator and oscillator circuit of the type which generates a given resting frequency in response to a specific reference potential applied as an input to the modulator comprising, in combination: means deriving from a modulating signal a signal proportional in amplitude to the amplitude of the envelope of said modulating signal; and means combining said modulating signal and said derived signal into a composite signal in which said derived signal forms the average value about which said modulating signal swings, the minimum value of said composite signal being always algebraically equal to or greater than said reference potential, so that the swings of said modulating signal are always on one side only of said reference potential and the shifts in frequency of the F-M output signal are one side only of the resting frequency.

8. A circuit as set forth in claim 7, wherein said deriving means comprises transformer means having a tapped secondary winding, a pair of unidirectional current devices, an impedance element and a wave filter having an output component, said winding, current devices and impedance element connected in circuit to form a full-wave rectifier, said filter having a long time constant relative to the period of one cycle of said modulating signal and being connected across said impedance element, and wherein said combining means comprises a second secondary winding on said transformer means and an output impedance element of sufficiently high impedance to constitute a negligible load on said filter, said second secondary winding and said output impedance element being arranged in series across said output component of said filter, one end of said output component being at said reference potential.

9. A circuit for producing a frequency-modulated wave having a frequency deviation on one side only of the resting frequency comprising in combination connections to a source of modulating signal, means for deriving from said modulating signal a signal proportional in amplitude to the amplitude of the envelope of said modulating signal, means for combining said modulating signal and said derived signal into a composite signal in which said derived signal forms the average value about which said modulating signal swings, selector means operable with said means for combining said modulating signal to select the direction of deviation from the resting frequency, and an F-M modulator and oscillator circuit said modulator having said composite signal from said selector means as an input signal, the minimum value of said composite signal being always algebraically equal to or greater than that value of input signal to the modulator which causes the oscillator to produce an output signal at the resting frequency, whereby the swings of said modulating signal produce frequency shifts in said output signal on one side only of said resting frequency.

References Cited in the file of this patent

UNITED STATES PATENTS

| | | |
|---|---|---|
| 2,095,327 | Hansell | Oct. 12, 1937 |
| 2,468,832 | Montgomery | May 3, 1949 |